(12) United States Patent
Okawa et al.

(10) Patent No.: US 8,475,958 B2
(45) Date of Patent: Jul. 2, 2013

(54) NICKEL HYDROGEN STORAGE BATTERY AND METHOD FOR MANUFACTURING NEGATIVE ELECTRODE THEREOF

(75) Inventors: Takashi Okawa, Kanagawa (JP); Tsuneyoshi Murakami, Kanagawa (JP); Kenichi Aoki, Osaka (JP); Hiroyuki Usui, Kanagawa (JP); Kimihiro Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1091 days.

(21) Appl. No.: 11/794,867

(22) PCT Filed: Dec. 28, 2005

(86) PCT No.: PCT/JP2005/024125
§ 371 (c)(1),
(2), (4) Date: May 7, 2008

(87) PCT Pub. No.: WO2006/073123
PCT Pub. Date: Jul. 13, 2006

(65) Prior Publication Data
US 2008/0261105 A1      Oct. 23, 2008

(30) Foreign Application Priority Data

Jan. 6, 2005   (JP) .................................. 2005-001206
Apr. 25, 2005  (JP) .................................. 2005-126045

(51) Int. Cl.
*H01M 6/10*       (2006.01)
(52) U.S. Cl.
USPC ..................... 429/218.2; 429/223; 429/94
(58) Field of Classification Search
USPC ......................... 429/218.2, 223, 94
See application file for complete search history.

(56) References Cited

U.S. PATENT DOCUMENTS

2003/0152824 A1 * 8/2003 Kasuga et al. .................. 429/94

FOREIGN PATENT DOCUMENTS

| JP | 51-66727   |   | 5/1976  |
| JP | 03-116654  |   | 5/1991  |
| JP | 03-274676  |   | 12/1991 |
| JP | 04-206345  |   | 7/1992  |
| JP | 04-206474  |   | 7/1992  |
| JP | 05-283069  |   | 10/1993 |
| JP | 06-020718  |   | 1/1994  |
| JP | 09-129195  |   | 5/1997  |
| JP | 3056521    | * | 4/2000  |
| JP | 2004-063325| * | 2/2004  |
| JP | 2004-303484|   | 10/2004 |
| JP | 2005-056674|   | 3/2005  |
| JP | 2005-056675|   | 3/2005  |

* cited by examiner

*Primary Examiner* — Ula C Ruddock
*Assistant Examiner* — Frank Chernow
(74) *Attorney, Agent, or Firm* — McDermott Will & Emery LLP

(57) ABSTRACT

A nickel hydrogen storage battery is provided which includes an electrode assembly formed by winding spirally a strip-like negative electrode (4) and a strip-like positive electrode with a separator interposed therebetween, the strip-like negative electrode (4) having a mixture layer containing a hydrogen storage alloy disposed on a core material. The electrode assembly is contained in a bottomed cylindrical container such that the negative electrode (4) forms the outermost peripheral portion. A portion corresponding to an outermost peripheral portion (5) of the negative electrode is a thin portion, and the thin portion is bent in advance in the winding direction of the electrode assembly to form an arc shape. In this manner, when the spirally wound electrode assembly is configured, the outermost peripheral portion of the negative electrode is prevented from peeling from the electrode assembly, and thus the insertability into the bottomed cylindrical container is improved.

2 Claims, 7 Drawing Sheets

NICKEL HYDROGEN STORAGE BATTERY AND METHOD FOR MANUFACTURING NEGATIVE ELECTRODE THEREOF

RELATED APPLICATIONS

This application is the U.S. National Phase under 35 U.S.C. §371 of International Application No. PCT/JP2005/024125, filed on Dec. 28, 2005, which in turn claims the benefit of Japanese Application Nos. 2005-001206, filed on Jan. 6, 2005, and 2005-126045, filed on Apr. 25, 2005, the disclosures of which Applications are incorporated by reference herein.

TECHNICAL FIELD

The present invention relates to a nickel hydrogen storage battery, and in particular, to an improvement in its negative electrode structure to improve insertability of an electrode assembly into a bottomed cylindrical container.

BACKGROUND ART

An alkaline storage battery is a repeatedly chargeable and dischargeable battery and has been widely used as a power source for portable devices. In particular, a nickel hydrogen storage battery, which employs a hydrogen storage alloy as a negative electrode active material, has high energy density and is relatively environmentally clean. Therefore, a nickel hydrogen storage battery is becoming widespread as a main power source of various portable devices.

In a current collecting method in a nickel hydrogen storage battery, a bottomed cylindrical container, which contains an electrode assembly composed of positive and negative electrodes, serves as a negative electrode terminal, and a sealing plate insulated from the container serves as a positive electrode terminal. The positive electrode is integrated with the sealing plate through a lead to form a current collecting structure, and the negative electrode is in contact with an inner wall side of the bottomed cylindrical container at the outermost peripheral portion thereof to form a current collecting structure.

In order to increase the capacity of such a nickel hydrogen storage battery, a method has been proposed in which, the thickness of the negative electrode located at the outermost peripheral portion of a spirally wound electrode assembly composed of positive and negative electrodes and a separator is reduced to be less than that of the other portion (for example, see the publication of Japanese Patent No. 3056521).

A conventional example described in the above publication of Japanese Patent No. 3056521 is specifically described with reference to FIGS. 11 and 12. In an alkaline storage battery which is applied also to nickel hydrogen storage batteries, a strip-like negative electrode 101 and a strip-like positive electrode 102 are wound spirally with a separator 103 interposed therebetween to form an electrode assembly, and the electrode assembly is contained in a bottomed cylindrical container 104, whereby the alkaline storage battery is configured. The negative electrode 101 is disposed so as to occupy the outermost peripheral portion of the electrode assembly. An outermost peripheral portion 105 of the negative electrode 101 is in contact with the container 104, and the negative electrode 101 is configured such that the thickness of the outermost peripheral portion 105 thereof is less than that of the other portion 106 (specifically, being 50% to 90%). The length L of the outermost peripheral portion 105 of the negative electrode 101 is substantially the same as the inner peripheral length of the container 104, and a boundary portion 107 is formed between the outermost peripheral portion 105 and the other portion 106.

DISCLOSURE OF THE INVENTION

Problems to be Solved by the Invention

Generally, the outermost peripheral portion of the negative electrode described in the above patent publication can be formed by reducing the thickness when a negative electrode mixture is applied to a collector, or by shaving off a negative electrode mixture layer formed to a thickness equal to that of the other portion, or by increasing the filling density. However, in each of the cases, when the negative and positive electrodes are wound spirally with the separator interposed therebetween to form the electrode assembly, only the outermost peripheral portion does not tend to follow the spiral shape and is peeled from the electrode assembly due to the influence of the difference in thickness between the outermost peripheral portion and the other portion of the negative electrode. In this case, the outermost peripheral portion of the negative electrode may be caught on the bottomed cylindrical container during insertion of the electrode assembly into the bottomed cylindrical container. Therefore, a problem arises in that insertion failure occurs.

This problem is particularly significant when the mixture layer on the outer side of the outermost peripheral portion of the negative electrode (on the inner wall side of the bottomed cylindrical container) is made thinner than that on the inner side (on the central side of the electrode assembly) and is disposed on the outer side when the electrode assembly is formed. Specifically, this is because a coated object having different coating thicknesses on the front and rear sides of the core material thereof has a property that, when the coated object is subjected to rolling, strain is generated by stress during the rolling to cause the coated object to be curled with its thinner side facing inward. Therefore, the negative electrode is curled in a direction opposite to the winding direction at the outermost peripheral portion of the electrode assembly.

The present invention solves the above-mentioned problem, and it is an object of the invention to prevent the outermost peripheral portion of a negative electrode from being peeled from a spirally wound electrode assembly when the electrode assembly is formed, whereby insertability into a bottomed cylindrical container is improved.

Means for Solving the Problems

In order to solve the above problem, a nickel hydrogen storage battery according to of the present invention is a nickel hydrogen storage battery including an electrode assembly contained in a bottomed cylindrical container with the electrode assembly formed by winding spirally a strip-like negative electrode and a strip-like positive electrode with a separator interposed therebetween, the negative electrode having a mixture layer containing a hydrogen storage alloy disposed on a core material, wherein: the negative electrode is disposed so as to occupy an outermost peripheral portion of the electrode assembly; the negative electrode has a thin portion at a portion corresponding to the outermost peripheral portion of the electrode assembly, the thin portion having a mixture layer thickness less than that of the other portion of the negative electrode; and the thin portion is bent in advance in a winding direction of the spirally wound electrode assembly to form an arc shape.

In the above invention, it is preferable that the nickel hydrogen storage battery be configured such that the thickness of the thin portion is different on front and rear sides of the core material and that one surface of the thin portion, which has a smaller mixture layer thickness, is in contact with an inner wall side of the bottomed cylindrical container.

In order to achieve the negative electrode structure, a method for manufacturing a negative electrode for use in a nickel hydrogen storage battery according to claim 3 of the present invention is a method for manufacturing a nickel hydrogen storage battery for use in a nickel hydrogen storage battery, the nickel hydrogen storage battery including an electrode assembly contained in a bottomed cylindrical container with the electrode assembly formed by winding spirally a strip-like negative electrode and a strip-like positive electrode with a separator interposed therebetween, the negative electrode having a mixture layer containing a hydrogen storage alloy disposed on a core material. The manufacturing method includes: a first step of applying a mixture paste containing the hydrogen storage alloy to the core material and drying the mixture paste to produce a negative electrode hoop having the mixture layer on both sides of the core material; a second step of pressing and cutting the negative electrode hoop to obtain the strip-like negative electrode; a third step of forming a thin portion at one end portion on a longitudinal side of the strip-like negative electrode by peeling a part of the mixture layer only from one side; and a fourth step of passing the thin portion through a gap between a hard roller and a soft roller to bend the thin portion into an arc shape such that a side having a smaller mixture layer thickness is situated on the outside.

In order to achieve the negative electrode structure method for manufacturing a negative electrode for use in a nickel hydrogen storage battery of the present invention is a method for manufacturing a nickel hydrogen storage battery for use in a nickel hydrogen storage battery, the nickel hydrogen storage battery including an electrode assembly contained in a bottomed cylindrical container with the electrode assembly formed by winding spirally a strip-like negative electrode and a strip-like positive electrode with a separator interposed therebetween, the negative electrode having a mixture layer containing a hydrogen storage alloy disposed on a core material. The manufacturing method includes: a first step of applying a mixture paste containing the hydrogen storage alloy to the core material and drying the mixture paste to produce a negative electrode hoop having the mixture layer on both sides of the core material and having a thin portion formed on a part of the core material, the thin portion having a smaller mixture layer thickness; a second step of pressing and cutting the negative electrode hoop to obtain the strip-like negative electrode; and a third step of passing the thin portion through a gap between a hard roller and a soft roller to bend the thin portion into an arc shape such that a side having the smaller mixture layer thickness is situated on the outside.

Is preferable that a metal roller be used as the hard roller, that a rubber roller having a metal shaft core coated with rubber be used as the soft roller, and that a driving unit be provided which rotates the rubber roller in a reversible manner.

According to the above invention, by bending the outermost peripheral portion of the negative electrode in the winding direction of the spirally wound electrode assembly to form an arc shape, smooth insertion of the electrode assembly into the bottomed cylindrical container can be achieved, and thus the occurrence of insertion failure can be reduced. This effect is particularly remarkable when a negative electrode intrinsically tends to bend in a direction opposite to the winding direction.

In order to solve the above problem, a nickel hydrogen storage battery of the present invention is a nickel hydrogen storage battery including an electrode assembly contained in a bottomed cylindrical container with the electrode assembly formed by winding spirally a strip-like negative electrode and a strip-like positive electrode with a separator interposed therebetween, the negative electrode having a mixture layer containing a hydrogen storage alloy disposed on a core material, wherein: the negative electrode is disposed so as to occupy an outermost peripheral portion of the electrode assembly; the negative electrode has a thin portion at a portion corresponding to the outermost peripheral portion of the electrode assembly, the thin portion having a mixture layer thickness less than that of a normal portion and having a higher filling density than that of the normal portion; and B/A is 0.15 or less, where A is the thickness of the thin portion and B is a deviation distance between respective center lines of the thin portion and the normal portion in a thickness direction on a cross section in a longitudinal direction.

In the above invention, it is preferable that the nickel hydrogen storage battery be configured such that the center line of the thin portion is deviated from the center line of the normal portion toward a central side of the spirally wound electrode assembly.

The ratio B/A should be 0.15 or less and is preferably 0.10 or less.

In the above invention, it is preferable that the nickel hydrogen storage battery be configured such that X/Y falls within the range of 1.03 to 1.15, where X is the filling density of the hydrogen storage alloy in the mixture layer of the thin portion and Y is the filling density of the hydrogen storage alloy in the mixture layer of the normal portion. It is more preferable that X/Y fall within the range of 1.07 to 1.11.

As such a method for manufacturing a negative electrode for use in a nickel hydrogen storage battery, a method for manufacturing a negative electrode of the nickel hydrogen storage battery of the present invention is a method for manufacturing a negative electrode for use in a nickel hydrogen storage battery, the negative electrode having a mixture layer containing a hydrogen storage alloy. The manufacturing method includes: a first step of applying a negative electrode mixture layer to both sides of a core material composed of a two-dimensional porous substrate to thereby produce a negative electrode hoop; a second step of uniformly rolling the negative electrode hoop; and a third step of again rolling only a portion of the negative electrode hoop, which corresponds to an outermost peripheral portion of an electrode assembly, to form a thin portion having a mixture layer thickness less than that of a normal portion, wherein the thin portion is formed such that B/A is 0.15 or less, where A is the thickness of the thin portion and B is a deviation distance between respective center lines of the thin portion and the normal portion in a thickness direction on a cross section in a longitudinal direction.

In the above invention, by bringing the center lines of the thin and normal portions of the negative electrode in the thickness direction close to each other on a longitudinal cross section to make the negative electrode substantially symmetric, the degree of curl can be reduced, and thus the occurrence of insertion failure into the bottomed cylindrical container can be significantly reduced.

The present invention is a method in which the first step in the method for manufacturing a negative electrode for use in a nickel hydrogen storage battery is more specified. This invention is the manufacturing method wherein the first step includes: applying a paste-like negative electrode mixture to both sides of the core material composed of the two-dimensional porous substrate; passing the core material having a hoop-like shape through a mixture application apparatus including a slit and comb-like center-guiding protrusions to thereby apply the negative electrode mixture to the core material, the slit being provided for determining the thicknesses of the negative electrode mixture layer corresponding to the normal portion having a larger thickness and the thin portion having a smaller thickness, the comb-like center-guiding protrusions being provided in both side surfaces of the slit and provided for determining the position of the core material in the thickness direction; and thereafter drying the negative electrode mixture to produce the negative electrode hoop.

In the above invention, it is preferable that the manufacturing method be configured such that the height of a step on an application surface of the slit is given by $X=t1/\alpha-t2/\alpha$, where X is the height of the step between coating surfaces of the slit at a portion for forming the normal portion and a portion for forming the thin portion, T1 and T2 are the distances of a wider portion and a narrower portion, respectively, between the both surfaces of the slit, the wider and narrower portions being bordered with the step, t1 and t2 are the thicknesses of a thicker portion and a thinner portion, respectively, of the negative electrode after application and drying, the thicker and thinner portions being bordered with the step, and $\alpha$ is an application shrinkage ratio which is a function of the application speed and the viscosity of the paste-like negative electrode mixture and is defined as $\alpha=t1/T1=t2/T2$.

In the manufacturing method of the above invention, by optimizing the height of the step on the slit surface and the shape of the slit surface, a negative electrode for use in a nickel hydrogen storage battery can be obtained in which each of the inner portion and the outermost peripheral portion has a desired thickness after application, rolling, and cutting into a single plate are completed. Furthermore, it is unnecessary to shave the negative electrode mixture after the electrode is formed, and thus problems such as loss in material cost, deterioration of working environment due to dust, the occurrence of a micro short circuit due to adhesion of dust particles, ignition of the hydrogen storage alloy in the negative electrode mixture due to friction heat can be solved.

EFFECTS OF THE INVENTION

According to the present invention, the occurrence of insertion failure of an electrode assembly can be reduced, and a high capacity type nickel hydrogen storage battery can be manufactured with high productivity.

BEST MODE FOR CARRYING OUT THE INVENTION

Hereinafter, embodiments for carrying out the present invention will be described.

First Embodiment

A first embodiment is characterized in that, in a nickel hydrogen storage battery including a spirally wound electrode assembly contained in a bottomed cylindrical container, the outermost peripheral portion of a negative electrode being in contact with the inner wall side of the bottomed cylindrical container is bent in advance in the winding direction of the spirally wound electrode assembly to form an arc shape.

By bending the outermost peripheral portion of the negative electrode in advance in the winding direction of the spirally wound electrode assembly to form an arc shape, the outermost peripheral portion of the negative electrode can be prevented from being peeled from the spirally wound electrode assembly when the electrode assembly is configured. In addition to this, the insertability of the electrode assembly into the bottomed cylindrical container can be improved, and the occurrence of insertion failure can be reduced.

In terms of increasing the capacity of nickel hydrogen storage batteries, it is preferable that the outermost peripheral portion of the negative electrode be a thin portion having a mixture layer thickness less than that of the other portion. In addition to this, in view of reaction balance with the positive electrode, it is desirable that, in the thin portion, the mixture layer thickness be smaller on the surface facing the inner wall side of the bottomed cylindrical container (i.e., the surface not facing the positive electrode) than on the opposite surface (i.e., the surface facing the positive electrode). In such a case, the thin portion is bent in advance in the winding direction of the spirally wound electrode assembly to form an arc shape such that the surface having a smaller mixture layer thickness is situated on the outside.

Figure 1:
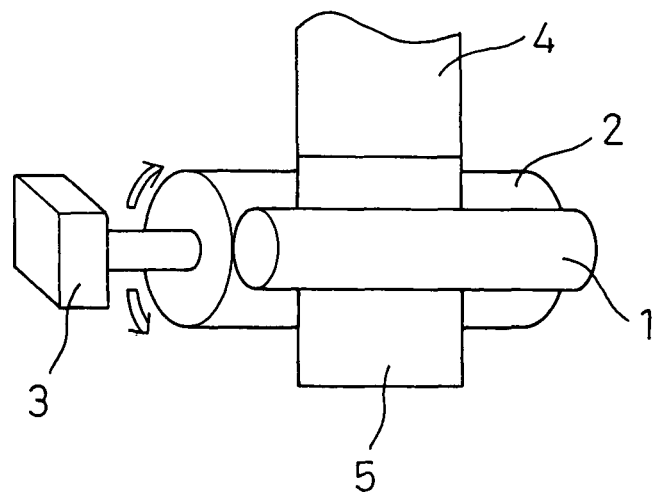
FIG. 1 is a schematic perspective view of a negative electrode bending apparatus of the present invention.
Figure 2:
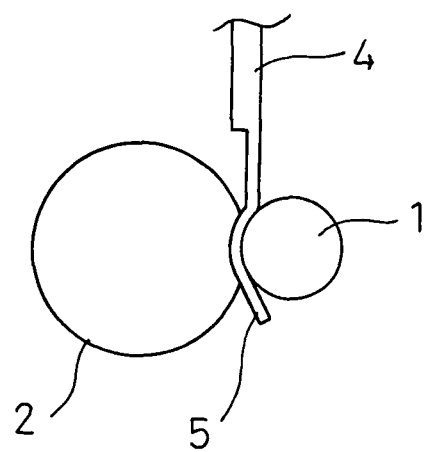
FIG. 2 is a schematic cross sectional view of the negative electrode bending apparatus of the present invention.

With reference to the drawings, a description is given of a facility to implement the above-described negative electrode structure. FIG. 1 is a schematic perspective view of a negative electrode bending apparatus of the present invention, and FIG. 2 is a schematic cross sectional view of the apparatus. An outermost peripheral portion 5 of a negative electrode 4 is passed through a gap of the apparatus, which includes a metal roller 1 serving as a hard roller and a rubber roller 2 serving as a soft roller having a metal core coated with rubber, as so to be disposed in pressure contact with each other. Thus, the outermost peripheral portion 5 is bent in advance into an arc shape. In this instance, a driving unit 3 has a function of generating rotation in a reversible manner as indicated by the arrows in FIG. 1. Specifically, the driving unit 3 is required to have the above function in order to preliminarily shape only the outermost peripheral portion 5 of the negative electrode by means of the present apparatus and in order not to bend the other portion of the negative electrode 4.

When, for example, the negative electrode 4 is preliminarily shaped such that the entire portion thereof is bent, a difficulty arises in conveying the negative electrode 4 when the spirally wound electrode assembly will be wound, which is not preferable. Furthermore, when the outermost peripheral portion 5 of the negative electrode is formed into a thin portion, a side having a larger mixture layer thickness is brought into press contact with the metal roller 1 as shown in FIG. 2, whereby the thin portion can be bent into an arc shape such that a side having a smaller mixture layer thickness is situated on the outside. Hence, the formation of the spirally wound electrode assembly is facilitated.

In this case, the process performed by means of the present apparatus is stabilized by setting the diameter of the metal roller 1 to less than the diameter of the rubber roller 2. Furthermore, the preliminary shaping can be reliably performed by setting the diameter of the metal roller 1 to less than the diameter of the spirally wound electrode assembly.

The above-described preliminary shaping step is performed in the final stage of the manufacturing of the negative electrode. Specifically, when the mixture layer thickness of the outermost peripheral portion of the negative electrode is same as that of the other portion, a first step of applying a mixture paste containing a hydrogen storage alloy to a core material and drying the mixture paste to produce a negative electrode hoop having a mixture layer on both sides of the core material is performed, followed by a second step of pressing and cutting the negative electrode hoop to obtain a strip-like negative electrode. Thereafter, the above-described preliminary shaping step is performed as a third step. Furthermore, when the negative electrode outermost peripheral portion is formed into a thin portion, the formation method can be selected from among two methods. The first method is a method in which the following steps are performed: a first step of applying a mixture paste containing a hydrogen storage alloy to a core material and drying the mixture paste to produce a negative electrode hoop having a mixture layer on both sides of the core material; a second step of pressing and cutting the negative electrode hoop to obtain a strip-like negative electrode; a third step of forming a thin portion at one end portion on the longitudinal side of the strip-like negative electrode by peeling a part of the mixture layer only from one side; and thereafter the above-described preliminary shaping step as a fourth step. The second method is a method in which the following steps are performed: a first step of applying a mixture paste containing a hydrogen storage alloy to a core material and drying the mixture paste to produce a negative electrode hoop having a mixture layer on both sides of the core material and having a thin portion formed on a part of the core material and having a smaller mixture layer thickness; a second step of pressing and cutting the negative electrode hoop to obtain a strip-like negative electrode; and thereafter the above-described preliminary shaping step as a third step. In each of the cases, a negative electrode capable of providing the effect of the present invention can be realized.

In the above cases, a hydrogen storage alloy is used as an active material for the negative electrode. To this hydrogen storage alloy, an appropriate amount of a conductive agent such as carbon black is added. In addition to this, an appropriate amount of a thickening agent such as carboxymethylcellulose (hereinafter abbreviated as CMC) and a binding agent such as a styrene-butadiene copolymer (hereinafter abbreviated as SBR) are added to the hydrogen storage alloy in accordance with need to form a paste. The paste is applied to or filled into a core material such as punched metal and then is dried, and the thus-formed core material is then rolled and cut, whereby the negative electrode is produced.

Nickel hydroxide is used as an active material for the positive electrode. To this nickel hydroxide, a conductive agent such as cobalt hydroxide or metal cobalt powder is added. In addition to this, a thickening agent such as CMC and a binding agent such as polytetrafluoroethylene are added to the nickel hydroxide in accordance with need to form a paste. The paste is applied to or filled into a core such as a foamed nickel three-dimensional porous body and then is dried, and the thus-formed core is then rolled and cut, whereby the positive electrode is produced.

A non-woven fabric of an olefin-based resin such as polypropylene may be used as the separator. Furthermore, the non-woven fabric may be subjected to hydrophilic treatment such as sulfonation in accordance with need.

An aqueous solution containing KOH, NaOH, and LiOH in a suitably adjusted ratio may be used as an electrolyte.

As the material for the bottomed cylindrical container, a material composed of iron or stainless steel and appropriately subjected to nickel plating or the like for rust prevention may be used.

Hereinafter, the present embodiment will be described in more detail by way of examples.

Example 1

A hydrogen storage alloy composed of $MmNi_{3.55}CO_{0.75}Al_{0.3}Mn_{0.4}$ was used, and the alloy was pulverized to a particle size of 3 to 50 μm by means of a pulverizer and was subjected to immersion treatment in a hot aqueous alkali solution. To 100 parts by weight of the hydrogen storage alloy, 0.2 parts by weight of CMC, 0.8 parts by weight of SBR, and water serving as a dispersion medium were added, and then the mixture was kneaded to produce a mixture paste. The mixture paste was applied to a punched metal collector subjected to nickel plating and was dried. Subsequently, this collector was rolled and cut into a predetermined shape and size to produce a negative electrode.

The outermost peripheral portion of this negative electrode was passed through a gap in an apparatus which includes a metal roller having a diameter of 15 mm and a rubber roller (a roller having a metal core coated with rubber) having a diameter of 60 mm so as to be disposed in pressure contact with each other, as shown in FIGS. 1 and 2. Hence, the outermost peripheral portion was bent in advance in the winding direction of a spirally wound electrode assembly to form an arc shape.

Figure 11:
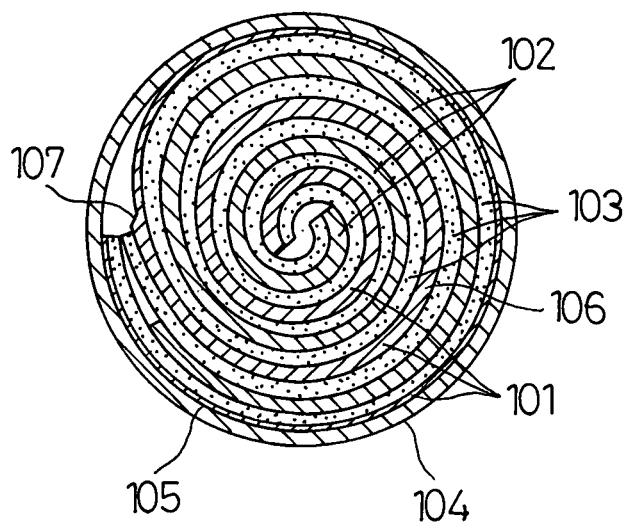
FIG. 11 is a cross sectional view of a nickel hydrogen storage battery of a conventional example.
Figure 12:
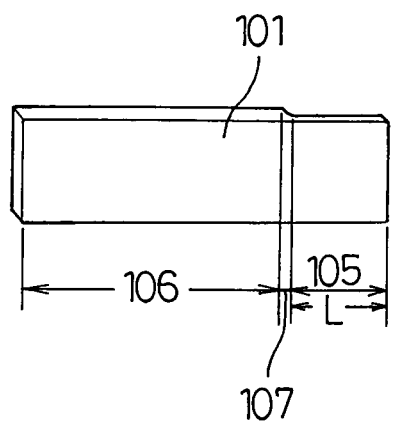
FIG. 12 is a perspective view of a negative electrode for the nickel hydrogen storage battery of the conventional example.

This negative electrode and a positive electrode composed of nickel hydroxide as the main component were wound into a spiral shape such that the bending direction of the outermost peripheral portion of the negative electrode was coincident with the winding direction. In this case, these electrodes were alternately stacked with a separator composed of a sulfonated polypropylene non-woven fabric interposed therebetween. Thus, a spirally wound electrode assembly having a diameter of 15 mm was produced. As in the conventional example shown in FIGS. 11 and 12, this electrode assembly was inserted into a bottomed cylindrical container formed by subjecting iron to nickel plating, thereby producing a nickel hydrogen storage battery. This battery was employed as the battery of Example 1.

Example 2

A nickel hydrogen storage battery similar to that of Example 1 was produced except that, in contrast to the battery of Example 1, before the outermost peripheral portion of the negative electrode was bent, a part of the mixture layer was peeled off only from one side of the outermost peripheral portion to form a thin portion and that a side having a larger mixture layer thickness was brought into pressure contact with the metal roller to thereby bend the thin portion into an arc shape with a side having a smaller mixture layer thickness situated on the outside. This battery was employed as the battery of Example 2.

Example 3

A nickel hydrogen storage battery similar to that of Example 1 was produced except that, in contrast to the battery of Example 1, when the negative electrode mixture paste was applied to the punched metal collector, the paste was applied to a portion corresponding to the outermost peripheral portion so as to provide a smaller mixture layer thickness to thereby form a thin portion and that a side having a larger mixture layer thickness was brought into pressure contact with the metal roller to thereby bend the thin portion into an arc shape with a side having a smaller mixture layer thickness situated on the outside. This battery was employed as the battery of Example 3.

Example 4

A nickel hydrogen storage battery similar to that of Example 2 was produced except that, in contrast to the battery of Example 2, the outermost peripheral portion of the negative electrode was bent into an arc shape by use of a metal roller having a diameter of 23 mm. This battery was employed as the battery of Example 4.

Example 5

A nickel hydrogen storage battery similar to that of Example 2 was produced except that, in contrast to the battery of Example 2, the outermost peripheral portion of the negative electrode was bent into an arc shape by use of a metal roller having a diameter of 60 mm. This battery was employed as the battery of Example 5.

Comparative Example 1

A nickel hydrogen storage battery similar to that of Example 1 was produced except that, in contrast to the battery of Example 1, the entire portion of the negative electrode was bent into an arc shape. This battery was employed as the battery of Comparative Example 1.

Comparative Example 2

A nickel hydrogen storage battery similar to that of Example 2 was produced except that, in contrast to the battery of Example 2, the entire portion of the negative electrode was bent into an arc shape. This battery was employed as the battery of Comparative Example 2.

Comparative Example 3

A nickel hydrogen storage battery similar to that of Example 1 was produced except that, in contrast to the battery of Example 1, the outermost peripheral portion of the negative electrode was not bent into an arc shape. This battery was employed as the battery of Comparative Example 3.

Comparative Example 4

A nickel hydrogen storage battery similar to that of Example 2 was produced except that, in contrast to the battery of Example 2, the outermost peripheral portion of the negative electrode was not bent into an arc shape. This battery was employed as the battery of Comparative Example 4.

For each of the obtained nickel hydrogen storage batteries of the Examples and the Comparative Examples, 1000 spirally wound electrode assemblies were produced, and the insertability of the electrode assemblies into the bottomed cylindrical container was evaluated. As evaluation criteria, a battery having an electrode assembly which was not insertable when the electrode assembly was inserted into the bottomed cylindrical container and a battery having an inserted electrode assembly with the outermost peripheral portion of the negative electrode broken or folded were determined to have insertion failure. The number of batteries having insertion failure was recorded. The results are shown in Table 1.

TABLE 1

| | Metal roller (mmφ) | Rubber roller (mmφ) | Roller diameter ratio metal/rubber | Diameter ratio metal roller/ electrode assembly |
|---|---|---|---|---|
| Example 1 | 15 | 60 | 0.25 | 1 |
| Example 2 | 15 | 60 | 0.25 | 1 |
| Example 3 | 15 | 60 | 0.25 | 1 |
| Example 4 | 23 | 60 | 0.38 | 1.5 |
| Example 5 | 60 | 60 | 1 | 4 |
| Comparative Example 1 | 15 | 60 | 0.25 | 1 |
| Comparative Example 2 | 15 | 60 | 0.25 | 1 |
| Comparative Example 3 | — | — | — | — |
| Comparative Example 4 | — | — | — | — |

| | Thickness of outermost peripheral portion | Formation of outermost peripheral thin portion | Bent portion | The number of batteries having insertion failure out of 1000 |
|---|---|---|---|---|
| Example 1 | The same as others | — | Outermost peripheral portion | 1 |
| Example 2 | Thinned | One side of mixture layer is peeled | Outermost peripheral portion | 2 |
| Example 3 | Thinned | Application thickness of mixture is changed | Outermost peripheral portion | 2 |
| Example 4 | Thinned | One side of mixture layer is peeled | Outermost peripheral portion | 4 |
| Example 5 | Thinned | One side of mixture layer is peeled | Outermost peripheral portion | 6 |
| Comparative Example 1 | The same as others | — | All | 15 |
| Comparative Example 2 | Thinned | One side of mixture layer is peeled | All | 35 |
| Comparative Example 3 | — | — | — | 12 |
| Comparative Example 4 | — | — | — | 57 |

As is clear from Table 1, the number of batteries having insertion failure could be much more reduced in the batteries of Examples 1 to 5 of the present invention than in the batteries of Comparative Examples 3 and 4 in which the outermost peripheral portion of the negative electrode was not bent in advance into an arc shape. Particularly, when the outermost peripheral portion of the negative electrode was formed into a thin portion, the effect of the present invention was remarkable (comparison between Examples 2 to 5 and Comparative Example 4).

However, in the batteries of Comparative Examples 1 and 2 in which not only the outermost peripheral portion of the negative electrode but also the entire portion was bent into an arc shape, the effect of reducing the occurrence of the insertion failure was found to a lesser extent. The reason for this may be as follows. Since the entire negative electrode was bent, the feedability of the negative electrode during winding of the spirally wound electrode assembly was reduced, and thus the position of the negative electrode in the electrode assembly was not stabilized. Hence, the shape of the electrode assembly was easily distorted. Therefore, the insertability into the bottomed cylindrical container was reduced due to a factor different from the reason, which causes the problem to be solved by the invention.

Furthermore, in Example 4 in which the diameter of the metal roller was larger than the diameter of the electrode assembly, the number of batteries having insertion failure was slightly larger than that in Example 2. The reason for this may be because the effect of the present invention was insufficient since the degree of bending of the outermost peripheral portion of the negative electrode was insufficient. In Example 5 in which the diameter of the metal roller was similarly larger than the diameter of the rubber roller, the above tendency was remarkable. From the above results, in the bending apparatus for the negative electrode for use in the nickel hydrogen storage batteries where the apparatus bends the outermost peripheral portion of the negative electrode in advance, the diameter of the metal roller is preferably less than the diameter of the rubber roller and more preferably less than the diameter of the spirally wound electrode assembly.

Second Embodiment

Hereinafter, a second embodiment of the present invention will be described with reference to the drawings.

Figure 3:
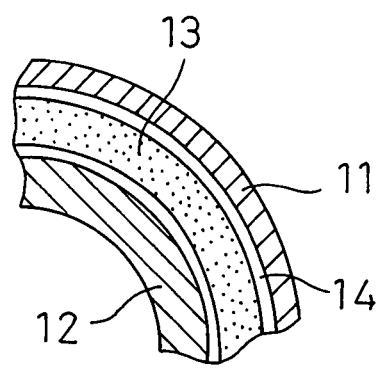
FIG. 3 is a fragmentary enlarged view of an electrode assembly of a nickel hydrogen storage battery of the present invention.

FIG. 3 is a fragmentary enlarged view of an electrode assembly of a nickel hydrogen storage battery of the second embodiment. A positive electrode 13 and a normal portion 12 of a negative electrode are wound spirally such that the positive electrode 13 and the normal portion 12 are alternately arranged with a separator 14 interposed therebetween. On the outermost periphery of the electrode assembly is disposed a thin portion 11 of the negative electrode, the thin portion 11 being thinner than the normal portion 12.

Figure 4:
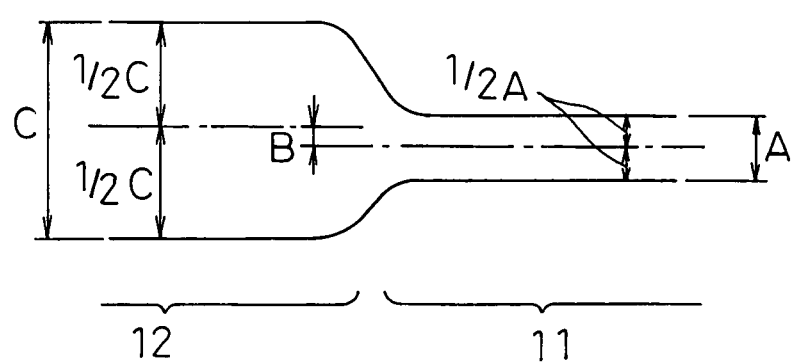
FIG. 4 is an enlarged cross sectional view of a main part of the nickel hydrogen storage battery of the present invention.

FIG. 4 is an enlarged cross sectional view of a main part, illustrating the vicinity of the boundary between the thin portion 11 and the normal portion 12 of the negative electrode of the above nickel hydrogen storage battery. Let the thickness of the thin portion 11 be A, and the thickness of the normal portion 12 be C. Then, the deviation distance B between respective center lines of the thin portion 11 and the normal portion 12 in the thickness direction on a cross section in the longitudinal direction is derived from the thickness A of the thin portion 11 and the thickness C of the normal portion 12. By bringing the center line of the thin portion 11 in the thickness direction on the longitudinal cross section and the center line of the normal portion 2 in the thickness direction on the longitudinal cross section close to each other to thereby reduce B/A to 0.15 or less, the influence of the strain caused by stress during rolling can be prevented from emerging as a curl in a direction opposite to the winding direction. Therefore, friction during insertion of the electrode assembly into the bottomed cylindrical container can be reduced, and thus the occurrence of an interior short circuit (insertion failure) due to winding displacement in the electrode assembly can be significantly reduced. B/A increases proportionally to the difference between the applied mixture layer thicknesses on the front and rear sides of the core material. When this ratio exceeds 0.15, the degree of curl becomes remarkable. Therefore the insertion failure which is the problem to be solved by the present invention cannot be solved.

In this instance, let the filling density of a hydrogen storage alloy in the mixture layer of the thin portion 11 be X, and the filling density of a hydrogen storage alloy in the mixture layer of the normal portion 12 be Y. Then, preferably, X/Y falls within the range of 1.03 to 1.15. When X/Y is less than 1.03, the thickness of the thin portion 11 is substantially same as the thickness of the normal portion 12. Therefore, a high capacity design aimed at the present invention is not easily achieved. On the contrary, when X/Y exceeds 1.15, the filling density in the thin portion 11 becomes too high, and thus the ability of oxygen gas absorption at the negative electrode during overcharge is reduced, whereby the internal pressure of the battery is increased slightly.

Figure 5:
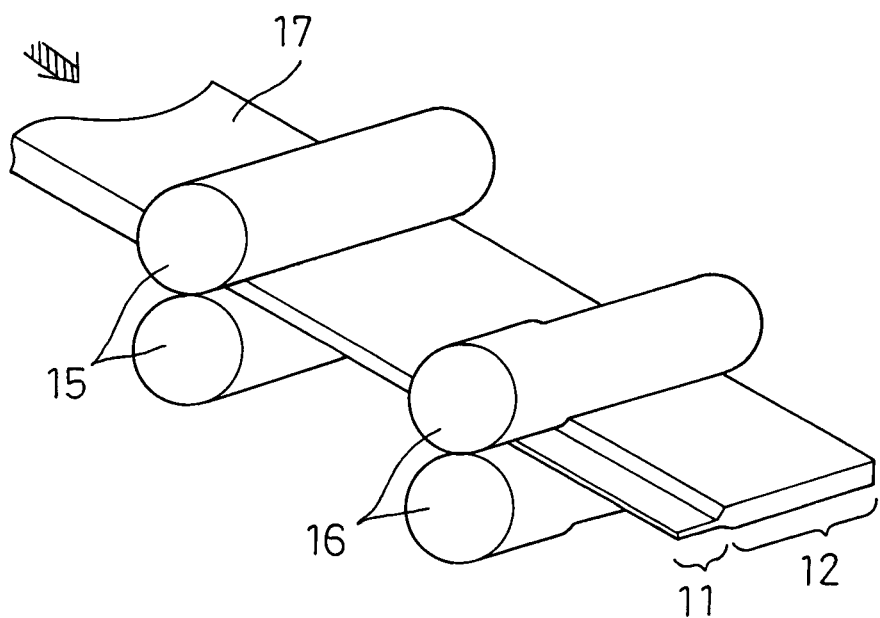
FIG. 5 is a schematic view illustrating a method for manufacturing a negative electrode of the nickel hydrogen storage battery of the present invention.

In order to embody the above-described negative electrode, it is preferable to employ the following method. That is, the manufacturing method includes: a first step of applying a negative electrode mixture layer to both sides of a core material composed of a two-dimensional porous substrate to thereby produce a negative electrode hoop; a second step of uniformly rolling the negative electrode hoop; and a third step of again rolling only a portion of the negative electrode hoop which corresponds to the outermost peripheral portion of the electrode assembly. A specific example of the method is shown in FIG. 5. A negative electrode hoop 17 produced through the first step is uniformly rolled through a pair of rolling rollers 15, and subsequently only a specific portion thereof is again rolled through a pair of stepped rollers 16 having a step. This negative electrode hoop 17 is cut in a direction orthogonal to the rolling direction, whereby a negative electrode having the thin portion 11 corresponding to the outermost peripheral portion of the electrode assembly and the normal portion 12 corresponding to the other portion can be produced continuously.

Furthermore, although the productivity is lower than that in the above-described method, a method may be employed which includes: after the negative electrode hoop 17 passes through the rolling rollers 15, cutting the negative electrode hoop 17 into a desired size to form a precursor of the negative electrode; and subjecting a part of the negative electrode precursor to flat pressing to form the thin portion 11.

Furthermore, by applying the negative electrode mixture layer on both sides of the core material of a two-dimensional porous substrate and then shaving a portion corresponding to the outermost peripheral portion of the electrode assembly such that the thickness of this portion is smaller than that of the other portion, the thin portion 1 can be formed more easily as compared to the case in which the application thickness is uniform over the entire portion.

In the negative electrode hoop 17, a hydrogen storage alloy is used as the active material therefor. To this hydrogen storage alloy, an appropriate amount of a conductive agent such as carbon black is added. In addition to this, an appropriate amount of a thickening agent such as carboxymethylcellulose (hereinafter abbreviated as CMC) and a binding agent such as a styrene-butadiene copolymer (hereinafter abbreviated as SBR) are added to the hydrogen storage alloy in accordance with need to form a paste. The paste is applied to a core material composed of a two-dimensional porous substrate such as punched metal, whereby the negative electrode hoop 17 is produced.

Nickel hydroxide is used as an active material for the positive electrode. To this nickel hydroxide, a conductive agent such as cobalt hydroxide or metal cobalt powder is added. In addition to this, a thickening agent such as CMC and a binding agent such as polytetrafluoroethylene are added to the nickel hydroxide in accordance with need to form a paste. The paste is applied to or filled into a core material such as a foamed nickel three-dimensional porous substrate and then is dried, and the thus-formed core material is then rolled and cut, whereby the positive electrode is produced.

A non-woven fabric of an olefin-based resin such as polypropylene may be used as the separator. Furthermore, the non-woven fabric may be subjected to hydrophilic treatment such as sulfonation in accordance with need.

An aqueous solution containing KOH, NaOH, and LiOH in a suitably adjusted ratio may be used as an electrolyte.

As the material for the bottomed cylindrical container, a material composed of iron or stainless steel and appropriately subjected to nickel plating or the like for rust prevention may be used.

Hereinafter, the present embodiment is described in more detail by way of examples.

Example 6

A hydrogen storage alloy composed of $MmNi_{3.55}Co_{0.7}Al_{0.3}Mn_{0.4}$ was used, and the alloy was pulverized to a particle size of 3 to 50 µm by means of a pulverizer and was subjected to immersion treatment in a hot aqueous alkali solution. To 100 parts by weight of the hydrogen storage alloy, 0.2 parts by weight of CMC, 0.8 parts by weight of SBR, and water serving as a dispersion medium were added, and then the mixture was kneaded to produce a mixture paste. This mixture paste was applied to a punched metal collector subjected to nickel plating, whereby the negative electrode hoop 17 was obtained. The mixture in a portion on one side of the negative electrode hoop 17 which corresponds to the thin portion 11 was shaved such that the weight of the mixture on the one side was 90% of the weight of the mixture on the other side. Subsequently, the filling density of the hydrogen storage alloy in the entire negative electrode mixture layer was adjusted to 5.4 g/ml (the entire thickness: 0.46 mm) by means of the rolling rollers 15. Subsequently, only the portion corresponding to the thin portion 1 was further rolled through the raised portions of the stepped rollers 16, whereby the filling density of the hydrogen storage alloy in this portion was adjusted to 5.9 g/ml (thickness: 0.40 mm). Here, the ratio B/A of the deviation distance B between respective center lines of the thin portion 1 and the normal portion 2 in the thickness direction on a cross section in the longitudinal direction to the thickness A of the thin portion was 0.03. The negative electrode hoop 17 after being rolled through the stepped rollers 16 was cut in a direction orthogonal to the rolling direction to form a negative electrode, and this negative electrode was employed as the negative electrode of Example 6.

Examples 7 and 8

Negative electrodes similar to that of Example 6 were produced except that, in contrast to the negative electrode of Example 6, the mixture on one side of a portion corresponding to the thin portion 11 was shaved such that the weight of the mixture on the one side was 80% and 60% of the weight of the mixture on the other side to thereby adjust the thicknesses of the thin portion 11 to 0.38 and 0.34 mm, respectively. Therefore, the ratios B/A of the deviation distance B between respective center lines of the thin portion 11 and the normal portion 12 in the thickness direction on the cross section in the longitudinal direction to the thickness A of the thin portion was adjusted to 0.06 and 0.15, respectively. These negative electrodes were employed as the negative electrodes of Examples 7 and 8, respectively.

Examples 9 to 12

Negative electrodes similar to that of Example 7 were produced except that, in contrast to the negative electrode of Example 7, the thin portions 11 were produced such that the filling densities of the hydrogen storage alloy therein were adjusted to satisfy X/Y=1.02, 1.04, 1.15, and 1.17, respectively. Therefore, the thicknesses of the thin portions 11 were adjusted to 0.41, 0.40, 0.36, and 0.35 mm, respectively. These negative electrodes were employed as the negative electrodes of Examples 9 to 12, respectively.

Example 13

A negative electrode similar to that of Example 6 was obtained except that, in contrast to the negative electrode of Example 6, the mixture on one side of the portion corresponding to the thin portion 11 was not shaved. Therefore, the thickness of the thin portion 11 was 0.42 mm, and the ratio B/A of the deviation distance B between respective center lines of the thin portion 11 and the normal portion 12 in the thickness direction on the cross section in the longitudinal direction to the thickness A of the thin portion was 0. This negative electrode was employed as the negative electrode of Example 13.

Comparative Example 5

A negative electrode similar to that of Example 6 was obtained except that, in contrast to the negative electrode of Example 6, the mixture on one side of the portion corresponding to the thin portion 11 was shaved such that the weight of the mixture on the one side was 40% of the weight of the mixture on the other side. Therefore, the thickness of the thin portion 11 was 0.30 mm, and the ratio B/A of the deviation distance B between respective center lines of the thin portion 11 and the normal portion 12 in the thickness direction on the cross section in the longitudinal direction to the thickness A of the thin portion was 0.2. This negative electrode was employed as the negative electrode of Comparative Example 5.

Comparative Example 6

A negative electrode similar to that of Example 6 was produced except that, in contrast to the negative electrode of Example 6, the thin portion 11 was not further pressed. This negative electrode was employed as the negative electrode of Comparative Example 6.

Each of the obtained negative electrodes of the Examples and the Comparative Examples and the strip-like positive electrode 3 formed by filling nickel hydroxide into the three-dimensional nickel porous substrate were wound into a spiral shape with the polypropylene separator 4 subjected to sulfonation treatment interposed therebetween, whereby each electrode assembly was produced such that the diameter thereof was 17.2 mm when the negative electrode of Example 6 was employed. Each of the electrode assemblies was inserted into an iron bottomed cylindrical container having an inner diameter of 17.8 mm and subjected to nickel plating, and the following evaluations were performed. The results are shown in Table 2.

(Measurement of Insertion Failure Ratio)

After each of the electrode assemblies was inserted into the bottomed cylindrical container, the shape of the electrode assembly was observed through X-ray transmission. A battery in which winding displacement in the electrode assembly occurred (specifically, the separator 14 was displaced to bring the positive electrode 13 and the negative electrode into direct contact with each other at a certain position) was determined to have insertion failure. The number of such batteries was recorded. For each of the examples, 1000 cells were observed. In Table 2, the number of detected defective batteries is shown as percentage.

(Measurement of the Internal Pressure of Batteries)

Each of the bottomed cylindrical containers containing the electrode assemblies was filled with a predetermined amount of the electrolyte, and the container was sealed. After break-in charging-discharging was performed, charging was performed to a charged electrical quantity of 110% with a current of 1 hour rate, and the battery internal pressure at this point was determined. The results are shown in Table 2.

TABLE 2

| | | Filling Density (g/ml) | | |
|---|---|---|---|---|
| | B/A | Thin Portion: X | Normal Portion: Y | X/Y |
| Example 6 | 0.03 | 5.9 | 5.4 | 1.09 |
| Example 7 | 0.06 | 5.9 | 5.4 | 1.09 |
| Example 8 | 0.15 | 5.9 | 5.4 | 1.09 |
| Example 9 | 0.06 | 5.5 | 5.4 | 1.02 |
| Example 10 | 0.06 | 5.6 | 5.4 | 1.04 |
| Example 11 | 0.06 | 6.2 | 5.4 | 1.15 |
| Example 12 | 0.06 | 6.3 | 5.4 | 1.17 |
| Example 13 | 0 | 5.9 | 5.4 | 1.09 |
| Comparative Example 5 | 0.2 | 5.9 | 5.4 | 1.09 |
| Comparative Example 6 | 0.03 | 5.4 | 5.4 | 1.00 |

| | Thickness of thin portion (mm) | Shaving of mixture in thin portion | Insertion failure (%) | Internal pressure of battery (MPa) |
|---|---|---|---|---|
| Example 6 | 0.4 | Yes | 0 | 0.75 |
| Example 7 | 0.38 | Yes | 0 | 0.8 |
| Example 8 | 0.34 | Yes | 0 | 0.83 |
| Example 9 | 0.41 | Yes | 5 | 0.6 |
| Example 10 | 0.4 | Yes | 0 | 0.7 |
| Example 11 | 0.36 | Yes | 0 | 0.95 |
| Example 12 | 0.35 | Yes | 0 | 1.3 |
| Example 13 | 0.42 | No | 5 | 0.8 |
| Comparative Example 5 | 0.3 | Yes | 25 | 1 |
| Comparative Example 6 | 0.44 | Yes | 15 | 0.8 |

In contrast to Comparative Example 5 in which the center lines are significantly separated from each other, in Examples 6 to 13 in which the ratio B/A is small, i.e., 0.15 or less, the insertability into the bottomed cylindrical container was improved due to the effect of reduction in the degree of curl of the thin portion 11. Except for examples 9 and 13, the occurrence of the insertion failure was completely prevented. The reason that the insertion failure was observed occasionally in Examples 9 and 13 may be as follows. The thickness of the thin portion 11 was slightly too large, and thus the diameter of the electrode assembly was larger than that in Example 6 (the actually measured value was 17.3 mm for Examples 9 and 13 and 17.2 mm for Example 6), whereby friction with the bottomed cylindrical container occurred. In Comparative Example 6 (the diameter of the electrode assembly: 17.4 mm), the insertion failure was found remarkably. This may be due to a similar reason. As described above, in order to achieve a high capacity design, the thickness of the thin portion 11 must be intentionally reduced to less than that of the normal portion 12.

In Examples 6, 10, and 11, X/Y fell within the range of 1.03 to 1.15, wherein X is the filling density of the hydrogen storage alloy in the mixture layer of the thin portion 11 and Y is the filling density of the alloy in the mixture layer of the normal portion 12. However, in Example 12, X/Y exceeded 1.15, and thus the filling density of the thin portion 11 was excessive. Therefore, the ability of oxygen gas absorption at the negative electrode during overcharge was reduced, and thus the battery internal pressure increased slightly.

Third Embodiment

Hereinafter, a third embodiment of the present invention will be described with reference to the drawings. The third embodiment relates to the first step of producing the negative electrode hoop in the second embodiment. The other configuration is same as that of the second embodiment, and thus the description thereof is omitted.

The above-described negative electrode hoop is manufactured by means of the manufacturing apparatus shown in FIGS. 1 to 3. The detail of the apparatus is described below.

Figure 6:
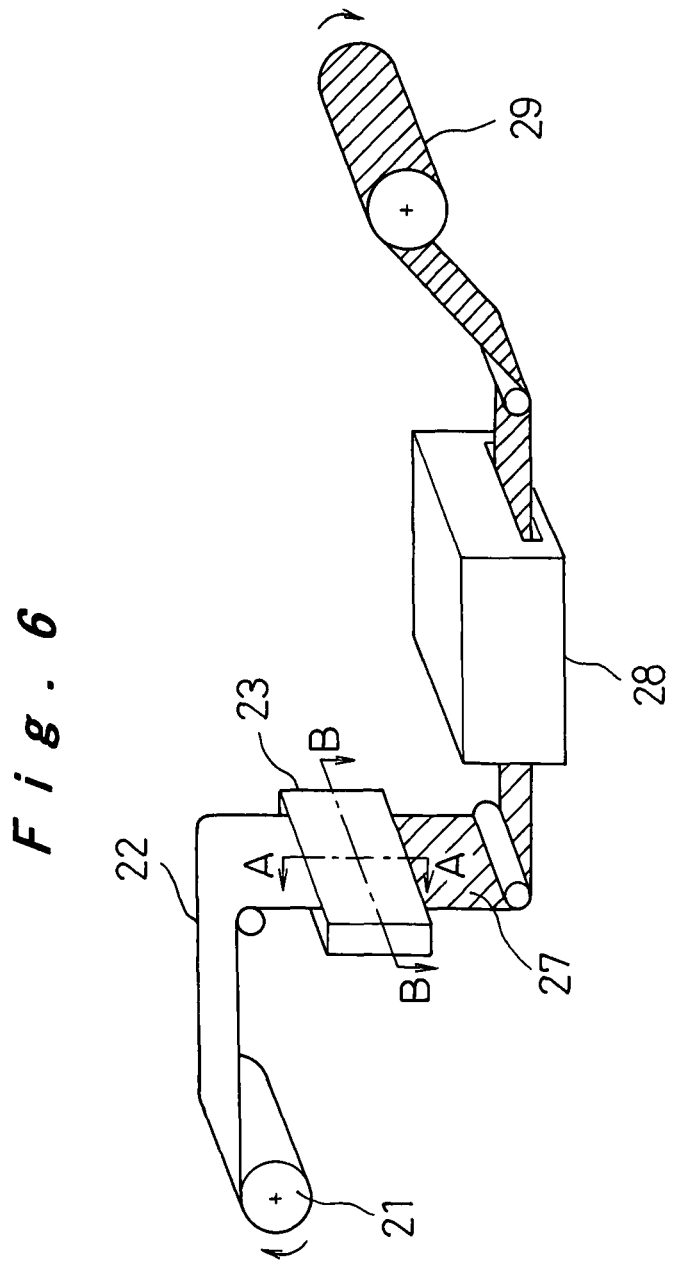
FIG. 6 is a cross sectional view of a battery electrode manufacturing apparatus used in the invention.
Figure 7:
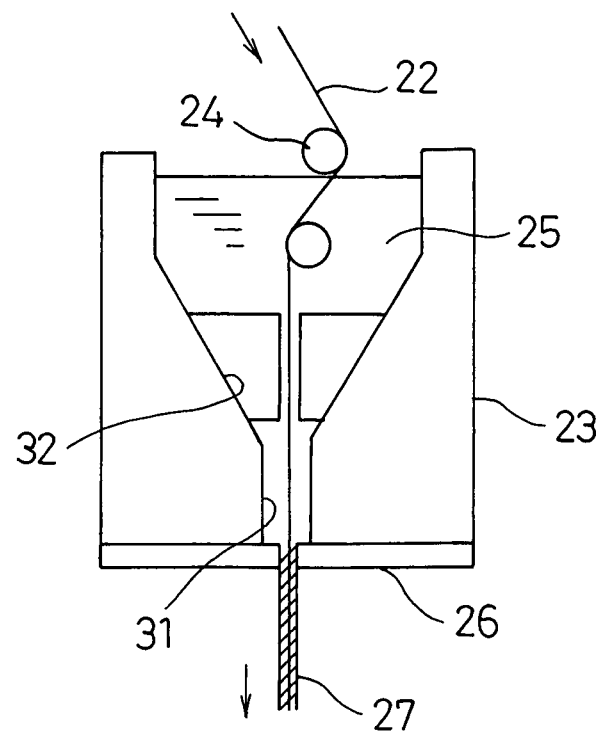
FIG. 7 is an enlarged cross sectional view taken along a line A-A in FIG. 6, illustrating the inside of a hopper.
Figure 8:
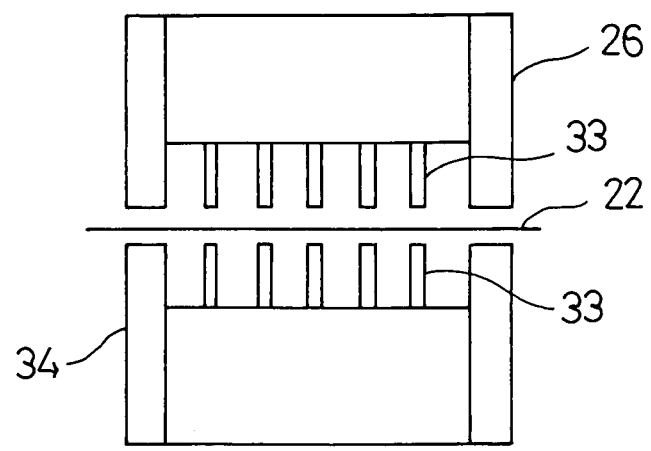
FIG. 8 is a reference cross sectional view of the inside of the hopper taken along a line B-B in FIG. 6.

FIG. 6 is a schematic view of the apparatus, and FIG. 7 is an enlarged cross sectional view of a hopper (a mixture application apparatus) taken along the line A-A in FIG. 6. Furthermore, FIG. 8 is a cross sectional view taken along the line B-B in FIG. 6. In these figures, reference numeral 21 designates a thin metal plate master roll, and reference numeral 2 designates a hoop-like thin metal plate (a core material formed of a two-dimensional porous substrate). Furthermore, reference numeral 23 designates a hopper having an opening in the upper side, and the depth width of the opening corresponds to the width size of the thin metal plate 22. Rotating center guide rollers 24 for holding the thin metal plate 22 therebetween are provided inside the hopper 23 and immediately below the outlet of the hopper. Reference numeral 25 designates a paste (a paste-like negative material mixture) stored in the hopper, and reference numeral 26 designates a paste application amount-adjusting slit provided in the lower portion of a straight portion 31 of the hopper 23. Reference numeral 27 designates a paste-applied sheet (the core material to which the negative electrode mixture has been applied) having passed through the hopper 23, and reference numeral 28 designates a tunnel drying furnace for drying the application paste 25. Reference numeral 29 designates a completed roll having the dried paste-applied sheet 27 wound thereon. In a tapered portion 32 in the hopper 23, center-guiding protrusions 33 are provided which have a shape shown in FIG. 8 and are opposed to each other such that the gap therebetween is substantially same as the thickness of the thin metal plate 22. Furthermore, for the purpose of improving the yield of the active material and of reserving a welding portion, a pair of sealing structures 34 is provided so as to be parallel to the center-guiding protrusions 33 in order to prevent the active material paste from leaking in the width direction.

An electrode (a negative electrode) in which a part thereof has a different thickness after application and drying can be obtained by providing a step in the corresponding portion of the application amount-adjusting slit 26. However, the thickness of the electrode must be controlled for each of the inner portion and the outermost peripheral portion, and the height of the step determines the ratio of the thicknesses of the above portions, respectively. It is difficult to configure a separated movable slit for allowing the step height to be changed since problems such as paste leakage and durability of the slit may arise. Therefore, it is necessary to set the step height capable of providing desired electrode thicknesses.

Figure 9:
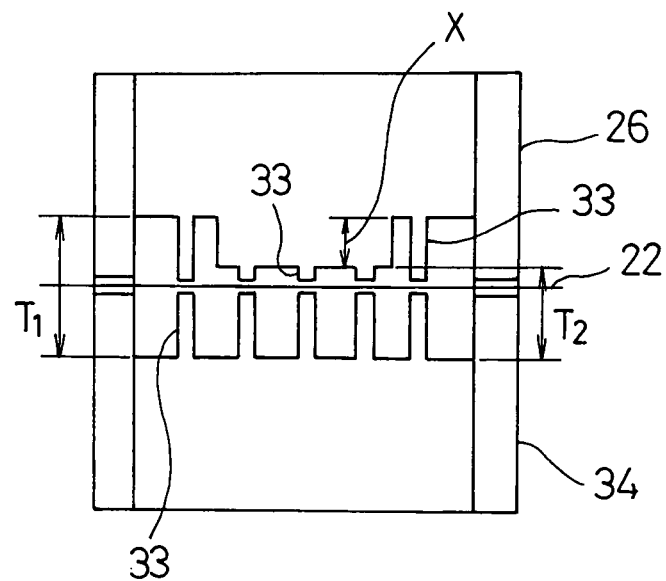
FIG. 9 is a cross sectional view of the inside of the hopper taken along the line B-B in FIG. 6.
Figure 10:
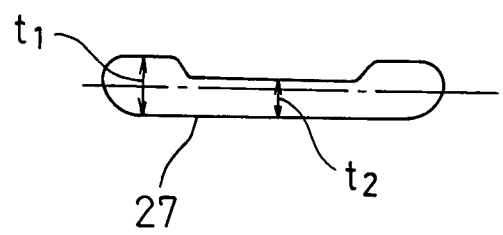
FIG. 10 is a cross sectional view of a negative electrode applied by means of a slit shown in FIG. 9.

FIG. 9 is a schematic view of an improved application slit produced for solving the above-mentioned problems, and FIG. 10 is a cross sectional view of an electrode after application and drying to which the paste has been applied by means of this slit.

Let the height of the slit be X, and the sizes of a wider portion and a narrower portion of the slit be T1 and T2, respectively, the wider and narrower portions being bordered with the step. Let the thicknesses of a thicker portion and a thinner portion of the electrode after application and drying be t1 and t2, respectively, the thicker and thinner portions being bordered with the step. Furthermore, an application shrinkage ratio which is a function of the application speed and the viscosity of the electrode mixture paste is defined as t1/T1=t2/T2=α. Then, when the height of the step was set to X=t1/α–t2/α, a desired electrode thickness after the application was obtained.

Hereinafter, Examples of this embodiment are given. These Examples relate to nickel hydrogen storage batteries, but can be applied to nickel-cadmium storage batteries and lithium ion secondary batteries.

Example 14

A hydrogen storage alloy represented by a general formula $MmNi_{3.55}CO_{0.75}Mn_{0.4}Al_{0.3}$ (Mm is misch metal which is a mixture of light rare-earth elements) was employed, and the alloy was pulverized to an average particle diameter of 30 μm in water by means of a wet ball mill, thereby obtaining alloy powder. This alloy powder was mixed with water serving as a dispersion medium, and Ketjen black serving as a conductive agent, CMC (carboxymethylcellulose) serving as a thickening agent, and SBR (styrene-butadiene rubber) serving as a binding agent were employed, thereby producing an active material paste.

This electrode mixture paste was applied to a thin metal plate by means of the apparatus shown in FIGS. 7 and 9 and then was dried. As the thin metal plate, an iron-made punched metal having a thickness of 60 μm, a punched-hole diameter of 1 mm, and a hole area rate of 42% and subjected to nickel plating was used. It was determined in advance that the shrinkage rate was 50% when the application speed was 2 cm/sec and the viscosity of the electrode mixture paste was 10000 cps. A target electrode thickness after rolling and machining into a single plate was 0.46 mm for the inner portion and 0.26 mm for the outermost peripheral portion. Since the thickness of the electrode mixture-applied portion was reduced to 50% after rolling, a target electrode thickness after application and drying was 0.86 mm for the inner portion and 0.46 mm for the outermost peripheral portion. Since the shrinkage ratio of the electrode mixture paste determined in advance was 50%, the distance of the slit was 1.66 mm for the inner portion and 0.86 mm for the outermost peripheral portion. Thus, the step height of the raised portion was 0.8 mm. Therefore, the shape of the application slit was set as follows. The width of the application slit was set to 200 mm, and a step was provided such that a portion from 70 mm to 150 mm from the edge of the slit was the raised portion, and the size of the step was set to 0.8 mm. The application was performed by using this stepped application slit and a slit not having a step on the sides opposed to each other and setting the slit spacing at both edges to 1.6 mm. After the application and drying, the hoop was cut to 35 mm in length in the longitudinal direction, and the cut large-sized hoop was rolled along a direction orthogonal to the application flow direction by means of a roll press. Subsequently, the hoop was cut at a portion of 100 mm in the width direction of the slit, whereby a hydrogen storage alloy negative electrode (a negative electrode for use in a nickel hydrogen storage battery) having a length of the inner portion of 60 mm and a length of the outermost peripheral portion of 40 mm was produced. This negative electrode was employed as the negative electrode of Example 14.

Examples 15 to 18

Hydrogen storage alloy negative electrodes similar to that of Example 14 were produced except that the step heights of the slit were 0.4 mm, 0.6 mm, 1.0 mm, and 1.2 mm, respectively. These negative electrodes were employed as the negative electrodes of Examples 15 to 18, respectively.

Comparative Example 7

An electrode similar to that of Example 14 was produced except that a slit not having a step on both sides. Subsequently, in the electrode having a length of 100 mm, a portion from the edge to 40 mm was polished with a No. 80 file until the thickness became 0.26 mm, thereby producing a hydrogen storage alloy negative electrode. This negative electrode was employed as the negative electrode of Comparative Example 7. The following evaluations were performed for the produced negative electrodes.

(Thickness Measurement)

500 sheets of each of the negative electrodes of the Examples and the Comparative Example were produced. 30 sheets were selected from them, and the thicknesses of the inner portion and the outermost peripheral portion were measured, and the average values were computed.

(Micro Short Circuit Failure Ratio)

A group of batteries was produced from the 500 sheets of each of the negative electrodes produced above, respective positive electrodes and respective separators, and a micro short circuit failure ratio was computed.

(Life Test)

5 cells were selected from each of the groups of the batteries produced above, and cycle life test was performed. A cycle number when the capacity was reduced to 60% of the initial capacity was recorded, and the average value of 5 cells was recorded.

(Measurement of the Dust Amount in a Workplace)

In the step of polishing with a file in the Comparative Example, the amount of dust in the atmosphere of a workplace was measured during the operation. In the measurement method, a general dust amount measurement apparatus was employed. Specifically, a certain amount of the atmosphere was sucked by a pump, and the concentration of nickel in foreign materials adhering to a filter was measured, whereby the amount of the hydrogen storage alloy was specified. Since this step is not present in the steps of the Examples, the dust amount in the atmosphere of the workplace in the single-plate cutting step was measured for comparison.

(The Number of Sheets Ignited During Polishing Operation)

The number of electrode plate sheets which were ignited in the step of polishing with a file in the Comparative Example was recorded. The above results are shown in Table 3.

TABLE 3

| | Step height of slit (mm) | Thickness of inner portion (mm) | Thickness of outermost peripheral portion (mm) |
|---|---|---|---|
| Example 14 | 0.8 | 0.47 | 0.26 |
| Example 15 | 0.4 | 0.46 | 0.37 |
| Example 16 | 0.6 | 0.47 | 0.30 |
| Example 17 | 1.0 | 0.46 | 0.21 |
| Example 18 | 1.2 | 0.45 | 0.17 |
| Comparative Example 7 | None | 0.46 | 0.26 |

| | Micro short circuit failure ratio (%) | Cycle life test (cycle) | Dust amount (mg/m$^3$) | The number of ignited sheets |
|---|---|---|---|---|
| Example 14 | 0.0 | 578 | 0.01 | — |
| Example 15 | 0.8 | 550 | *Atmosphere of workplace of single-plate cutting step | — |
| Example 16 | 0.2 | 563 | | — |
| Example 17 | 0.0 | 505 | | — |
| Example 18 | 0.0 | 441 | | — |
| Comparative Example 7 | 2.6 | 432 | 0.69 | 43 |

The thicknesses of the inner portions were same respectively, and each of the outer portions was formed to have a value close to the target value. Since the shrinkage ratio was 50% and another 50% was applied by rolling, the thickness was reduced to about 25% of the distance of the slit. In each of the Examples, the micro short circuit failure ratio was significantly improved as compared to that of Comparative Example 7. This may be because dust adhesion due to polishing with a file was reduced. The reason that the micro short circuit ratio was slightly high in Examples 15 and 16 may be as follows. Since the thickness of the outermost peripheral portion was larger than the target thickness, the diameter of the assembly exceeds the inner diameter of the container. Therefore, when the assembly was inserted into the container, the electrode mixture on the outermost periphery portion was shaved, whereby dust was generated and serves as the cause. In the life test, the cycle numbers in Examples 14, 15, and 16 were longest and were equivalent. The cycle number becomes shorter in the order of Examples 17 and 18. This may be because the amount of the entire hydrogen storage alloy is small due to the small amount of the electrode mixture in the outermost peripheral portion. The reason that the cycle number in Comparative Example 7 is shortest is because, during the life test, the capacity of some samples was suddenly reduced due to a micro short circuit caused by dust. According to the above, it has been clarified that the quality of the batteries is significantly improved by providing a step to the slit and removing the file polishing step. In particular, it has been clarified that the quality is further improved by providing a step by taking the shrinkage ratio into account.

The dust amount in the workplace for the file polishing step of Comparative Example 7 was significantly increased as compared to that in single-plate machining step of Example 14. Furthermore, during the operation, the hydrogen storage alloy in the electrode mixture was ignited in 43 sheets due to friction heat. Specifically, it has been clarified that the environment and safety in the workplace can be significantly improved by removing the file polishing step.

It is needless to say that the loss of materials was drastically reduced by removing the file polishing step.

INDUSTRIAL APPLICABILITY

According to the present invention, the occurrence of insertion failure of the electrode assembly of high capacity nickel hydrogen storage batteries can be significantly reduced, and thus the productivity of the present battery can be significantly improved. Therefore, the applicability and the spillover effect of the present invention are extremely large.

The invention claimed is:

1. A nickel hydrogen storage battery comprising: an electrode assembly contained in a bottomed cylindrical container with the electrode assembly formed by winding spirally a strip-like negative electrode and a strip-like positive electrode with a separator interposed therebetween, the negative electrode having a mixture layer containing a hydrogen storage alloy disposed on a single core material, wherein:
the negative electrode is disposed so as to occupy an outermost peripheral portion of the electrode assembly;
the negative electrode has a normal portion and a thin portion, wherein the thin portion is provided at a portion corresponding to the outermost peripheral portion of the electrode assembly, the thin portion having a mixture layer thickness less than that of the normal portion of the negative electrode;
the thin portion is bent in advance in a winding direction of the spirally wound electrode assembly to form an arc shape;
the normal portion has a first edge and a second edge;
the thin portion has a first edge and a second edge;
the first edge of the thin portion is indented from the first edge of the normal portion in a thickness direction on a cross section in a longitudinal direction;
the first edge of the thin portion is indented from the second edge of the normal portion in a thickness direction on a cross section in a longitudinal direction;
the second edge of the thin portion is indented from the first edge of the normal portion in a thickness direction on a cross section in a longitudinal direction;
the second edge of the thin portion is indented from the second edge of the normal portion in a thickness direction on a cross section in a longitudinal direction; and
B/A is 0.15 or less, where A is a thickness of the thin portion and B is a deviation distance between respective center lines of the thin portion and the normal portion in a thickness direction on a cross section in a longitudinal direction.

2. The nickel hydrogen storage battery according to claim 1, wherein: the thickness of the thin portion is different on front and rear sides of the core material: and one surface of the thin portion which has a smaller mixture layer thickness is in contact with an inner wall side of the bottomed cylindrical container.

* * * * *